April 28, 1959     B. J. MERKLE     2,883,880
REDUCTION GEARING
Filed Jan. 19, 1953
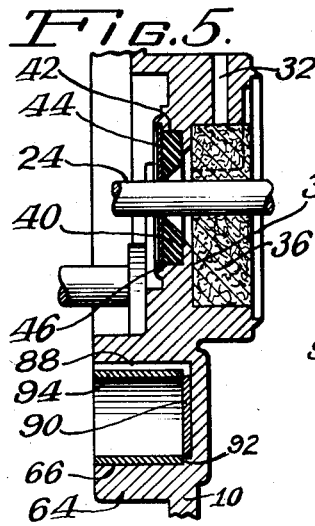
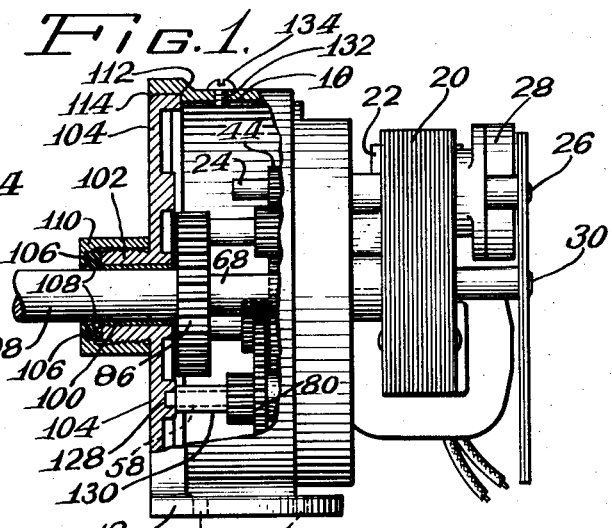
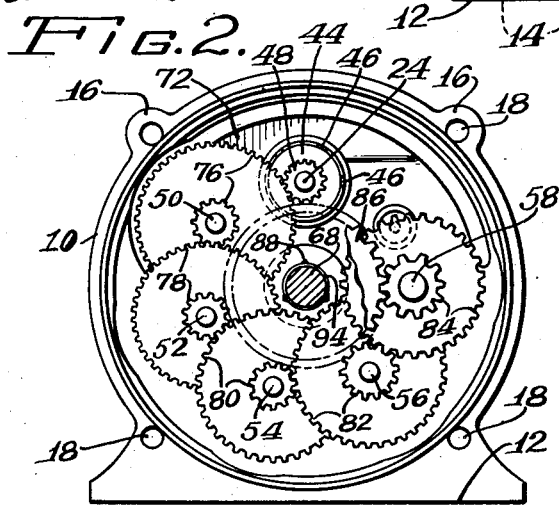
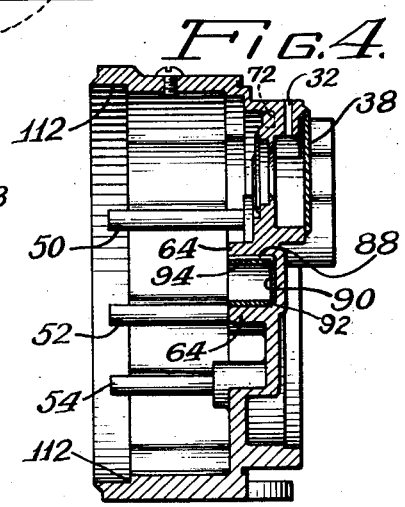
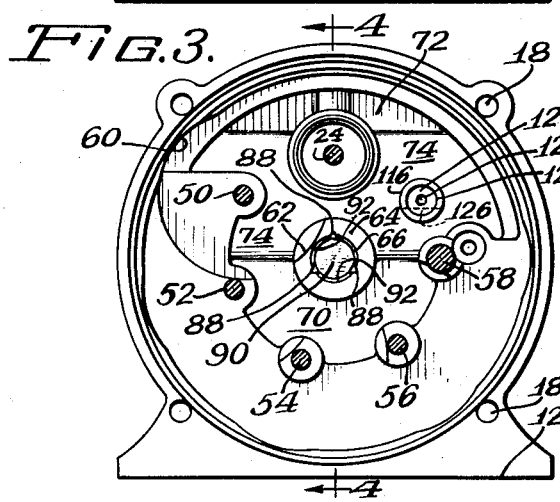
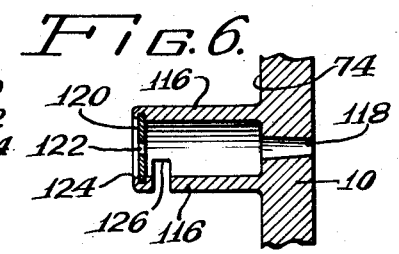
Inventor:
Bernard J. Merkle
By Kent W. Worrell
Atty.

United States Patent Office
2,883,880
Patented Apr. 28, 1959

2,883,880

REDUCTION GEARING

Bernard J. Merkle, Chicago, Ill.

Application January 19, 1953, Serial No. 331,857

2 Claims. (Cl. 74—606)

This invention relates in general to a reduction gearing and is more particularly described as a reduction gear drive for fractional electric motor operations although it may be adopted in other types of gearing.

One of the principal difficulties in reduction gearing is that for proper operation, the casings containing the gears must be substantially sealed or practically air-tight to prevent dirt and abrasive material from engaging the gears and at the same time to keep the gears well lubricated so that the gearing will operate smoothly without friction and with the greatest mechanical efficiency.

One of the principal objects of the invention is to provide seals surrounding the shafts which extend to the outside of the gear casing for actuation by the driving motor and also for the shaft which extends from the gearing to effect the resultant drive.

A further object of the invention is to provide means for relieving the pumping effect of the output shaft due to longitudinal movement of the shaft itself.

A further object of the invention is to provide seals for the motor driving shaft and the reduction gear driving shaft.

A further object of the invention is to provide adequate oiling recesses and oiling spaces within the casing for lubricating the gears and the driving shafts upon which they are positioned.

A still further object is to provide an oil outlet breather in the wall of the casing which permits a restricted passage of air to and from the casing without any loss of oil therethrough.

Other objects of the invention will appear in the specification and will be apparent from the accompanying drawings in which, Fig. 1 is a side elevation partly in section of a reduction gear driving unit having an electric motor secured to the casing with its driving shaft extending directly through the wall of the casing.

Fig. 2 is a face view of the casing without the cover showing the arrangement of the driving gears and some of the oil chambers therein.

Fig. 3 is a view of the casing similar to Fig. 2 with the gears removed and showing the oil recesses and other parts more clearly.

Fig. 4 is a sectional view taken on the line 4—4 of Fig. 3.

Fig. 5 is an enlarged detail sectional view of the motor shaft and the thrust chamber at the inner end of the reduction gear output shaft; and Fig. 6 is a sectional view of the air and oil separation breather.

As reduction gears of this class are usually sealed after the gears are set for delivery of a particular driving speed, it is extremely important not only that the reduction gear casing is capable of retaining oil therein for lubricating the gears and the driving shafts, but also that the gears are protected from dust and dirt or any deteriorating material which tends to abrade or wear the gears unduly and also to provide for the insertion of additional oil and to prevent oil from being unduly agitated and forced from the gear casing under pressure.

Referring now more particularly to the drawings, a gear casing 10 preferably circular in form is provided with a flat base 12 at one side by means of which it may be secured to any support by means of openings 14 in feet extending laterally from the base. The casing is also provided about its periphery with ears 16 and perforations 18 by means of which the casing may be secured to a surface at right angles to the base 12.

At the rear of the casing is an electric motor 20 having a rotatable armature 22 mounted upon a shaft 24 which extends into the casing providing a drive therefor. This motor is secured against the outer face of the casing by screws or rivets 26 extending through the sides of an outer bearing 28 and through the motor armature into the casing and by screws or rivets 30 extending through the sides of the motor armature into the rear side of the casing. The particular connection and operation of the motor forms no part of this invention, but provides a source of power for operating the gearing in a well known manner.

At the top of the casing is an oil hole 32 which communicates with an oiling chamber 34 containing a felt pad 36 or other oil distributing material surrounding the motor shaft 24, this chamber being sealed by a plate 38, but lubricating this side of the shaft. The outer bearing 28 for the motor is likewise provided with an oiling aperture (not shown) for lubricating the outer bearing of the motor.

The other side of the oiling chamber 34 is sealed from the interior of the casing by a liquid seal 40 seated in a recess 42 surrounding the shaft and held in place at the inside of the casing by a plate 44 and with a lip 46 turned inwardly around the plate or at intervals around the periphery thereof. Any leakage of lubrication along the shaft 26 through this seal 40 and the plate 44 helps to lubricate the interior of the casing and the driving gears therein.

Extending outwardly from the inside of the casing are a plurality of pins for mounting the reduction gears thereon. These pins are parallel to the motor shaft 24 which projects into the casing and has a driving gear 48 mounted thereon. The first bearing pin 50 is located at a greater distance from the axis of the casing than pins 52, 54, and 56, all of approximately the same diameter and also at a greater distance than a final bearing pin 58 which is usually somewhat larger than the other pins.

The bearing pin 50 is at the center of a circular recess in the rear wall of the casing which has a circular portion 60 extending in the marginal edge and a circular arc 62 extending into a boss 64 which has a central recess 66 for seating the end of a power drive shaft 68. This circular recess 60, 62 permits a gear of larger diameter than the gears on the succeeding bearing pins to be mounted upon this first pin 52 for a first reduction of the speed of the driving motor.

The pins 52, 54 and 56 are set at the marginal edge of a circular recess 70 at the inside of the rear wall of the casing which extends less than the boss 64 to provide a substantial space at the inside of the casing for receiving and storing lubricant below the level of gears mounted on bearing pins if the casing is in a position with its outer face opening outwardly. At the upper portion of the casing as shown in Figs. 2 and 3 is an arcuate recess 72 which is slightly deeper at the inside than the recess 70 with a projecting flat portion 74 which extends from the inside of the recess 72 to the outer edge of the recess 70 at about the axis of the central recess 66.

By coring out the inside and other portions of the casing in this manner, not only are additional oil receiving chambers provided, but also the construction of the casing is made lighter and stronger for the material used, and also a large proportion of weight and material is saved in producing the casing.

Different combinations of driving gears in pairs are mounted upon each of the bearing pins, 50, 52, 54 and 56, a first driving gear 76 engaging the motor driving gear 48 mounted on the motor shaft 24 and other pairs of driving gears 78, 80, 82 and 84 being mounted upon the successive pins 52, 54, 56 and 58 in a well known manner to produce any desired reduction speed. The last small gear of the pair 84 engages a large driving gear 86 mounted upon a power delivery shaft 68.

The inner end of the power delivery shaft 68 is inserted, but not too tightly, in the recess 66 of the boss 64 so it may have a limited endwise movement. The boss has longitudinal notches 88 at intervals about the outer periphery of the recess which also extend through a shoulder 92 at the inside of the casing for seating an end plate 90 within the shouldered portion at the inner end of the recess 66. A bearing sleeve 94 for receiving the end of the shaft 68 is inserted tightly into the bore or recess 66 against the shoulder 92 so that it forms a fixed bearing for the end of the shaft. The grooves or notches 88 are at the outside of this bearing sleeve 94 and provide a restricted passage for lubrication from the inside of the sleeve at the end of the shaft, around the edge of the end plate 90 and outside of the sleeve 94. It is common for power shafts of generators, motors and other driving mechanisms to be mounted for limited longitudinal vibration or oscillation to reduce localized wearing of the shaft and its bearing. When the shaft 68 oscillates endwise, there will be a slight to and fro pumping action of lubrication at the inner end of the sleeve which rests upon the shoulder 92, and through the grooves 88, to insure a movement and agitation of the lubrication around the sleeve and at the end of the shaft 68 at all times.

Secured to the power delivery shaft 68 is the driven gear 86 of large diameter which meshes with the small gear of the driving pair 84 mounted on the large bearing pin 58 so that substantial power may be delivered by the power shaft. The outer end of the power shaft 68 has an enlarged portion 98 which extends tightly through a bearing sleeve 100 secured in a central boss 102 of a cover plate 104. A lubrication tight joint is made at the outer end of the boss by a liquid seal 106 of rubber or similar material which has an inwardly extending lip 108 and is also pressed inwardly by a gland 110 engaging the seal and threaded upon the outside of the boss to press the seal inwardly and against the end of the boss 102 as the gland is moved inwardly upon the threads.

The cover 104 is seated in a shouldered recess 112 in the outer edge of the casing and a lip 114 is pressed inwardly over the outer edge of the cover to seal it tightly in place in a well known manner. As thus sealed and connected, the reduction gearing will deliver a considerable thrust by means of the outward projection 98 of the delivery shaft even though the motor 20 is of fractional horsepower but is operated at high speed.

Extending from inside of the casing and from the raised flat portion 74 thereof is a cylindrical wall 116 with a reduced hole 118 at the inner end thereof extending through the rear wall of the casing and at the outer end of this cylindrical wall is a closure plate 120 having a perforation 122 therein and secured over the end of the cylinder thus formed by an inwardly turned lip 124 engaging the outer periphery of the plate, or by any other suitable means. In the wall of the cylinder adjacent the plate is a transverse cut 126 at one side thereof preferably in a downward direction depending upon how the casing is mounted, the cut being preferably at the lower side of the cylinder.

This construction may be described as a breather and the outermost end of the breather is closely adjacent and partially covered by the larger gear of the driving gear pair 84 so that if there is any accumulation of lubricant within the casing which tends to escape therefrom under pressure, it may be blown out through the opening 122 into the breather casing and there separated into air and lubricant, the lubricant of which passes through the slot 126, and the air passes through the outside of the casing through the opening 118 in the rear wall thereof. Thus any frothy accumulation of lubricant is discharged by the operation of the gears into the breather and there the opening 26 which extends downwardly, allows the body of the lubricant to drip back or return into the casing whereas any surplus of air passes through the opening 118 to the outside of the casing.

Although the casing may receive some lubricant from the motor driving shaft 24, it is not sufficient to initially lubricate the casing and a separate oiling opening 132 is provided in the wall of the casing which may be threaded to receive a small screw 134 which closes the opening but which may be removed for inserting the oil through the opening.

Thus the casing may be partially filled with oil, the recesses back of the gears or at the inside of the casing may be partially filled with oil and in any position, the casing will not be over-full of lubricant as any surplus may be discharged through the breather if the discharge cut 126 thereof is also covered with lubricant.

In seating the gear couples upon the bearing pins, the outer ends of the pins project beyond the bottom of the shouldered recess 112 as shown more clearly in Fig. 4 and the outer ends of these pins each project into a corresponding recess 128 at the inside of the cover (see Fig. 1), the distance between any gear couple and the adjacent face of the inside of the cover being taken up by a filler sleeve 130 which thereby holds the gear couple in mesh with the proper adjacent gear couples thereby preventing the gear arrangement once properly set up from becoming disconnected or disengaged when the cover is properly applied thereto. This also strengthens the bearing pins by supporting them at both ends and provides a strong and dependable driving connection. The gear driving couples are located in an overlapping series beginning with the couple 76 mounted upon the bearing pin 50 and continuing upon bearing pins 52, 54, 56 and 58 in succession until the smaller gear of the gear couple 84 meshes with the large gear 86 upon the power delivery shaft.

While a preferred construction has thus been described in some detail, it should be regarded as an illustration or example rather than as a limitation or restriction of the invention, since various changes in the construction, combination and arrangement of the parts may be made without departing from the spirit and scope of the invention.

I claim:

1. In a reduction gearing a casing having means for attaching it to a support, a driving motor for the gearing having a driving shaft extending through the rear wall of the casing, reduction gearing within the casing connected to the driving shaft and having a power delivery shaft extending from the casing, a cover for the casing through which the power delivery shaft extends, means in the wall of the casing to admit lubricant thereto, a combined breather and oil separator in the casing communicating with the inside and outside thereof, to separate oil and air therein and to discharge air from the casing and to return lubricant thereto, the breather and oil separator comprising a chamber projecting from the rear wall inside of the casing having a passage through the wall of the casing to the outside thereof, a perforated closure at the outer end of the chamber and a transverse cut in the lower portion of the wall of the chamber communicating with the inside of the casing so that a mixture of air and lubricant discharged through the said perforation will be separated into oil which flows through the transverse cut back into the casing and the air therefrom will escape through the said passage to the outside of the casing.

2. A reduction gear drive comprising a casing, a power drive having a shaft extending into the casing, a power delivery shaft having a limited longitudinal movement and extending from the casing to the outside thereof, a reduction gear drive between the power shaft and the power delivery shaft, means for mounting the inner end of the power delivery shaft and for receiving and directing lubricant longitudinally therein around the shaft, and causing a pulsating movement of the lubricant as the power delivery shaft oscillates longitudinally, in which the rear wall inside of the casing has a recess closed at the inner end and with angular grooves at the sides, a bearing sleeve in which the power drive shaft fits closely, the grooves forming passages at the outside of the sleeve, and a thrust plate for engaging the end of the shaft at the inner end of the recess, the recess having a shouldered portion at the inner end through which the grooves extend and the inner end of the bearing sleeve engaging the shoulder with passages between the plate and the end of the sleeve communicating with the inner ends of the said grooves.

References Cited in the file of this patent

UNITED STATES PATENTS

| | | |
|---|---|---|
| 1,674,141 | Sperry | June 19, 1928 |
| 1,804,193 | Winther | May 5, 1931 |
| 1,974,974 | Puffer | Sept. 25, 1934 |
| 2,069,571 | Andrew | Feb. 2, 1937 |
| 2,073,348 | Merkle | Mar. 9, 1937 |
| 2,155,815 | Wollman | Apr. 25, 1939 |
| 2,351,921 | Bullard | June 20, 1944 |